United States Patent
Viselli et al.

(10) Patent No.: US 10,975,835 B2
(45) Date of Patent: Apr. 13, 2021

(54) SEGMENTED CONCRETE HULL FOR WAVE ENERGY CONVERTERS AND METHOD OF CONSTRUCTING

(71) Applicant: University of Maine System Board of Trustees, Orono, ME (US)

(72) Inventors: Anthony M. Viselli, Bangor, ME (US); Habib J. Dagher, Veazie, ME (US)

(73) Assignee: University of Maine System Board of Trustees, Orono, ME (US)

( * ) Notice: Subject to any disclaimer, the term of this patent is extended or adjusted under 35 U.S.C. 154(b) by 217 days.

(21) Appl. No.: 16/330,196

(22) PCT Filed: Sep. 5, 2017

(86) PCT No.: PCT/US2017/050045
§ 371 (c)(1),
(2) Date: Mar. 4, 2019

(87) PCT Pub. No.: WO2018/045368
PCT Pub. Date: Mar. 8, 2018

(65) Prior Publication Data
US 2019/0211797 A1    Jul. 11, 2019

Related U.S. Application Data

(60) Provisional application No. 62/382,899, filed on Sep. 2, 2016.

(51) Int. Cl.
*F03B 13/18* (2006.01)
*F03B 13/20* (2006.01)
(Continued)

(52) U.S. Cl.
CPC .............. *F03B 13/18* (2013.01); *F03B 13/12* (2013.01); *F03B 13/14* (2013.01); *F03B 13/16* (2013.01);
(Continued)

(58) Field of Classification Search
CPC .......... F03B 13/18; F03B 13/12; F03B 13/14; F03B 13/16; F03B 13/20; Y02E 10/30;
(Continued)

(56) References Cited

U.S. PATENT DOCUMENTS 3,788,254 A    1/1974  Sheil
6,768,216 B1 *  7/2004  Carroll .................. F03B 13/148
                                                    290/42
(Continued)

FOREIGN PATENT DOCUMENTS

CN    2348131 Y    11/1999
CN    1492144 A    4/2004
(Continued)

OTHER PUBLICATIONS

First Chinese Office Action, Application No. 201780065133.9, dated Apr. 27, 2020.
(Continued)

*Primary Examiner* — Hoang M Nguyen
(74) *Attorney, Agent, or Firm* — MacMillan, Sobanski & Todd, LLC (57) ABSTRACT

A wave energy converter (10) is capable of floating on a body of water (BW), moving in response to waves (W) occurring in the body of water (BW), and includes a hull (12) connected to a heave plate (14). The wave energy converter (10) is characterized in that the hull (12) is formed from reinforced concrete, a plurality of connecting tendons (16) extend between the hull (12) and the heave plate (14), and a power take off (66) is attached to each connecting tendon (16).

16 Claims, 10 Drawing Sheets

(51) Int. Cl.
*F03B 13/12* (2006.01)
*F03B 13/14* (2006.01)
*F03B 13/16* (2006.01)

(52) U.S. Cl.
CPC .......... *F03B 13/20* (2013.01); *F05B 2230/60* (2013.01); *F05B 2250/231* (2013.01); *F05B 2250/72* (2013.01); *Y02E 10/30* (2013.01)

(58) Field of Classification Search
CPC ............ F05B 2250/231; F05B 2250/72; F05B 2230/60
USPC ................ 60/495–500, 504, 505; 290/42, 53
See application file for complete search history.

(56) References Cited

U.S. PATENT DOCUMENTS

| | | | |
|---|---|---|---|
| 10,202,170 B2 | 2/2019 | Dagher et al. | |
| 2003/0165361 A1 | 9/2003 | Richter et al. | |
| 2004/0202511 A1 | 10/2004 | Bae | |
| 2008/0309088 A1* | 12/2008 | Agamloh | H02K 7/1876 290/53 |
| 2009/0021017 A1 | 1/2009 | Steenstrup | |
| 2009/0212571 A1* | 8/2009 | Atilano | F03B 13/186 290/53 |
| 2009/0251258 A1* | 10/2009 | Rhinefrank | H02K 15/03 335/306 |
| 2011/0012358 A1 | 1/2011 | Brewster et al. | |
| 2011/0304145 A1 | 12/2011 | Raisch | |
| 2013/0033039 A1 | 2/2013 | Echenique Gordillo | |
| 2014/0215930 A1 | 8/2014 | Zavitz et al. | |
| 2017/0363058 A1* | 12/2017 | Etherington | H02K 7/075 |
| 2019/0331085 A1 | 10/2019 | Mundon et al. | |

FOREIGN PATENT DOCUMENTS

| | | |
|---|---|---|
| DE | 102014009843 A1 | 12/2015 |
| GB | 2056574 A | 3/1981 |
| JP | S5457047 A | 5/1979 |
| WO | 2015120227 A1 | 8/2015 |
| WO | 2016138088 A1 | 9/2016 |

OTHER PUBLICATIONS

Chilean Office Action, Application No. 201900556, dated Mar. 18, 2020.
Supplementary Partial European Search Report, Application No. 17847676.8, dated Jan. 28, 2020.
Second Chilean Office Action, Application No. 201900556, dated Jun. 15, 2020.
European Extended Search Report, Application No. 17847676.8, dated Jun. 29, 2020.
The extended European search report, Application No. 21150747.0, dated Mar. 1, 2021.

* cited by examiner

SEGMENTED CONCRETE HULL FOR WAVE ENERGY CONVERTERS AND METHOD OF CONSTRUCTING

CROSS-REFERENCE TO RELATED APPLICATIONS

This application claims the benefit of U.S. Provisional Application No. 62/382,899, filed Sep. 2, 2016, the disclosure of which is incorporated herein by reference.

BACKGROUND OF THE INVENTION

This invention relates in general to wave energy converters (WECs). In particular, this invention relates to an improved hull for a WEC and an improved method of manufacturing and assembling a hull for a WEC.

Wave power in the earth's oceans is abundant and reliable, and has long been considered a promising renewable energy source. WECs have been conceived to convert this abundant wave power into electricity. Although attempts to effectively convert wave power into usable energy have been made for over a century, wave power is currently not widely employed by the energy industry.

Over the past three or more decades, many different wave energy concepts have been investigated by companies and academic research groups around the world. Although many working designs have been developed and tested, such as through modeling and wave tank-tests, only a few concepts have progressed to testing at sea.

WECs suitable for commercial use are under development and designed to be deployed in open water locations that experience waves (W), such as in oceans. The electric power produced by the WEC may then be transmitted to a location, such as on shore location, where the electric power may be used. The transmission of the electric power is typically via an undersea cable.

Known WECs often consist of two or more connected floating bodies or one floating body connected to a fixed point such as the sea bed. The relative motion and loads generated between the two floating bodies, or between the one floating body and the sea bed, is used to generate electric power through a power take-off system such as though pumping a hydraulic fluid through a motor or through a direct drive system, such as a power take off (66). Early WEC designs were capable of producing power up to several hundred kW. It is envisioned however, that WECs with a capacity of multiple MW possible. Known types of WECs include wave activated bodies, oscillating water columns, overtopping devices, point absorbers, and point attenuators.

Typically, the floating bodies, also called hulls, are constructed using ship-building methods of steel. Steel hulls have been in use for many years for ships, oil and gas platforms, and early WECs. Steel poses some challenges for renewable energy structures where cost targets are extremely low for both initial construction and maintenance. Steel hulls can be very expensive to build and maintain and are likely to be produced in low labor cost areas away from the ocean.

WECs need to be optimized to effectively extract wave energy under most wave conditions and be constructed from materials capable of withstanding the known problems experienced by marine technologies, including corrosion, fatigue, biofouling, impact loading, and fractures. The typical means of protecting against fouling and corrosion of steel structures is regular maintenance and repainting. But this is time-consuming and costly. In addition, the use of antifouling paints may be detrimental to the marine environment and require the WEC to be removed from service, thus causing reductions in power availability.

Thus, it would be desirable to provide an improved hull for a WEC and an improved method of assembling a hull for a WEC.

SUMMARY OF THE INVENTION

This invention relates to an improved hull for a WEC and an improved method of manufacturing and assembling a hull for a WEC. In a first embodiment, an improved wave energy converter that is capable of floating on a body of water, moving in response to waves occurring in the body of water, and includes a hull connected to a heave plate is characterized in that the hull is formed from reinforced concrete, a plurality of connecting tendons extend between the hull and the heave plate, and a power take off is attached to each connecting tendon.

In a second embodiment, a wave energy converter that is capable of floating on a body of water, moving in response to waves occurring in the body of water, and includes a buoy anchored to a bed of the body of water is characterized in that the buoy is formed from pre-stressed reinforced concrete and comprises a stationary member and a float slidably mounted to the stationary member, a foundation is configured to rest on the bed of the body of water and to anchor the wave energy converter to the bed of the body of water, a cable extends between the buoy and the foundation, and a power take off is attached to the cable and to the float.

In a third embodiment, a hull for a wave energy converter is configured for attachment to a heave plate, the wave energy converter including a plurality of connecting tendons extending between the hull and the heave plate and a power take off attached to each connecting tendon, the wave energy converter further capable of floating on a body of water and moving in response to waves occurring in the body of water. The hull is characterized in that it is formed from a plurality of reinforced concrete wedge-shaped hollow sections, wherein each wedge-shaped hollow section has side mating faces, a first end wall, a second end wall, an inner circumferential wall, an outer circumferential wall, and a hollow interior cavity, and wherein a plurality of ducts extend circumferentially through the first and second end walls, the hull further including at least one post-tensioning tendon extending through each of the plurality of circumferentially extending ducts in the first and second end walls, the post-tensioning tendons stressed and anchored to a portion of the hull and connecting at least two adjacent wedge-shaped hollow sections together, and wherein when assembled to form the hull, the plurality of hollow sections define a hollow chamber within the assembled hull.

In a fourth embodiment, a method of assembling a wave energy converter includes the steps of constructing reinforced concrete wedge-shaped hollow sections of a wave energy converter hull, each wedge-shaped hollow section having side mating faces, a first end wall, a second end wall, an inner circumferential wall, an outer circumferential wall, and a hollow interior cavity, and a plurality of ducts extending circumferentially through the first and second end walls, assembling the wedge-shaped hollow sections to form the hull, extending at least one post-tensioning tendon through each of the plurality of ducts in the first and second end walls, the post-tensioning tendons stressed and anchored to a portion of the hull and connecting at least two adjacent wedge-shaped hollow sections of the hull together, constructing reinforced concrete wedge-shaped hollow sections of a wave energy converter heave plate, each wedge-shaped hollow section having side mating faces, a first end wall, a second end wall, an inner circumferential wall, an outer circumferential wall, and a hollow interior cavity, and a plurality of ducts extending circumferentially through the first and second end walls, assembling the wedge-shaped hollow sections to form the heave plate, extending at least one post-tensioning tendon through each of the plurality of ducts in the first and second end walls, the post-tensioning tendons stressed and anchored to a portion of the heave plate and connecting at least two adjacent wedge-shaped hollow sections of the heave plate together, attaching a plurality of connecting tendons between the hull and the heave plate, and attaching a power take off to each tendon to define the wave energy converter.

Various aspects of this invention will become apparent to those skilled in the art from the following detailed description of the preferred embodiment, when read in light of the accompanying drawings.

DETAILED DESCRIPTION OF THE PREFERRED EMBODIMENT

Referring now to the drawings, there is illustrated in FIGS. 1 through 5 a first embodiment of a wave energy converters (WEC) 10 according to this invention. The WEC 10 is shown deployed in a body of water BW, such as the sea, and anchored to a bed, such as the sea bed SB, of the body of water BW (see FIGS. 1 and 3). It will be understood that the bed may be the bed of any body of water BW in which the WEC 10 is placed into operation. The WEC 10 includes a first embodiment of an improved floatation body or hull 12 and an improved heave plate 14. In the illustrated embodiment, the hull 12 and the heave plate 14 are connected by a plurality of first or connecting tendons 16.

Mooring lines 15 may be attached to the hull 12 of the WEC 10 and further attached to anchors, such as the anchors 17 in the seabed SB to limit to movement of the WEC 10 on the body of water BW.

Figure 1:
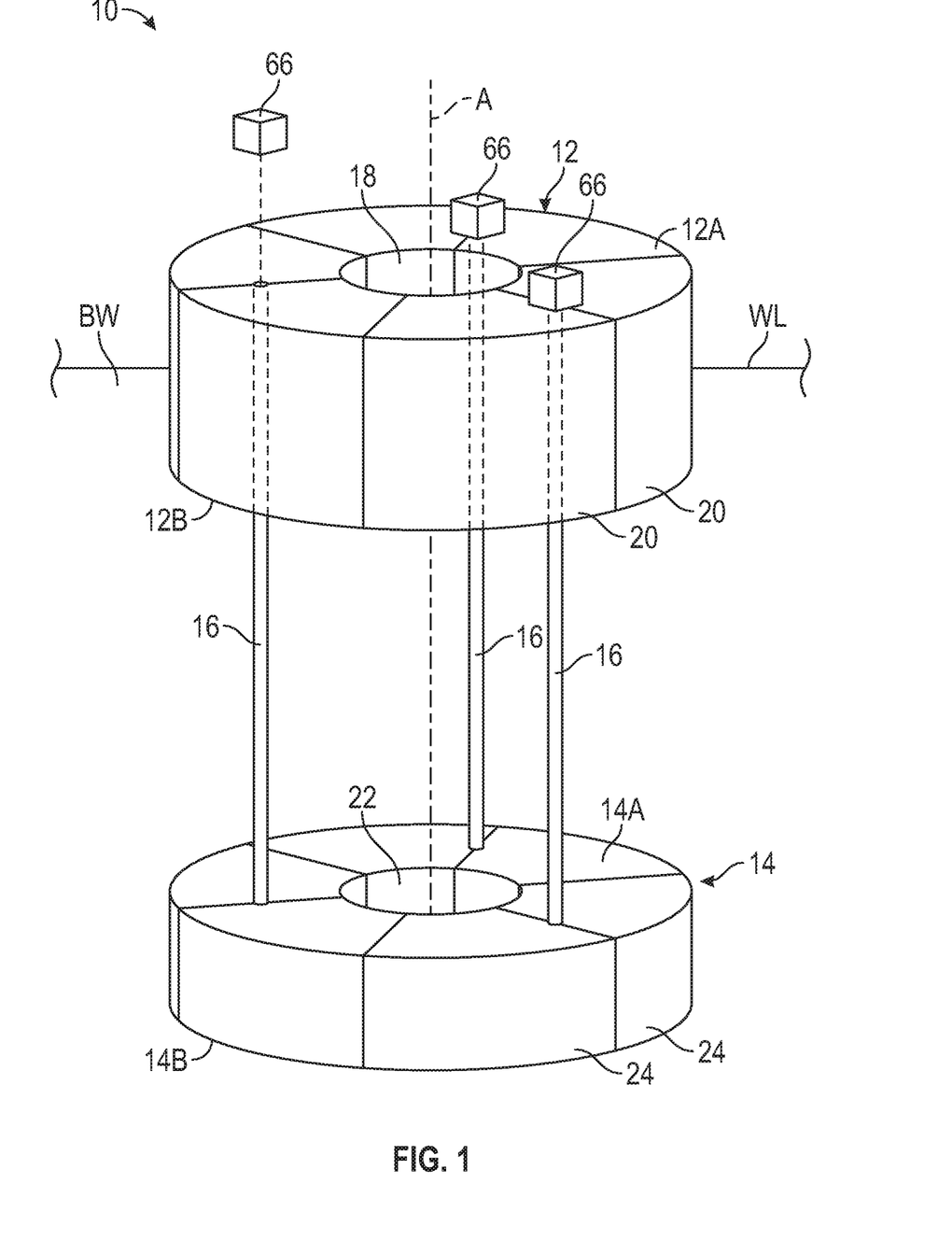
FIG. 1 is a perspective view of a first embodiment of a wave energy converter in accordance with this invention.
Figure 2:
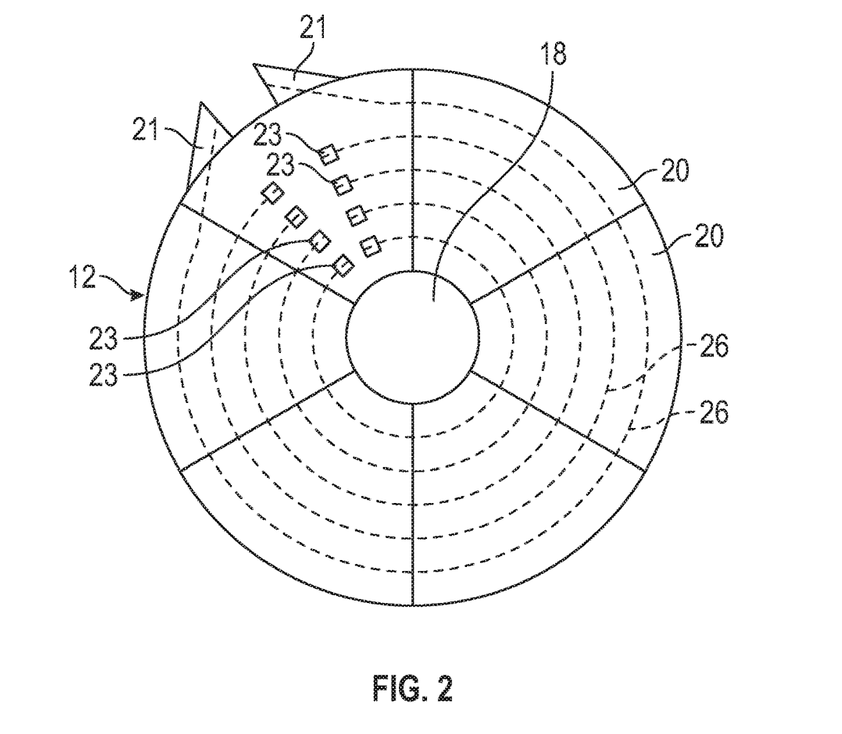
FIG. 2 is a top plan view of the hull shown in FIG. 1.
Figure 3:
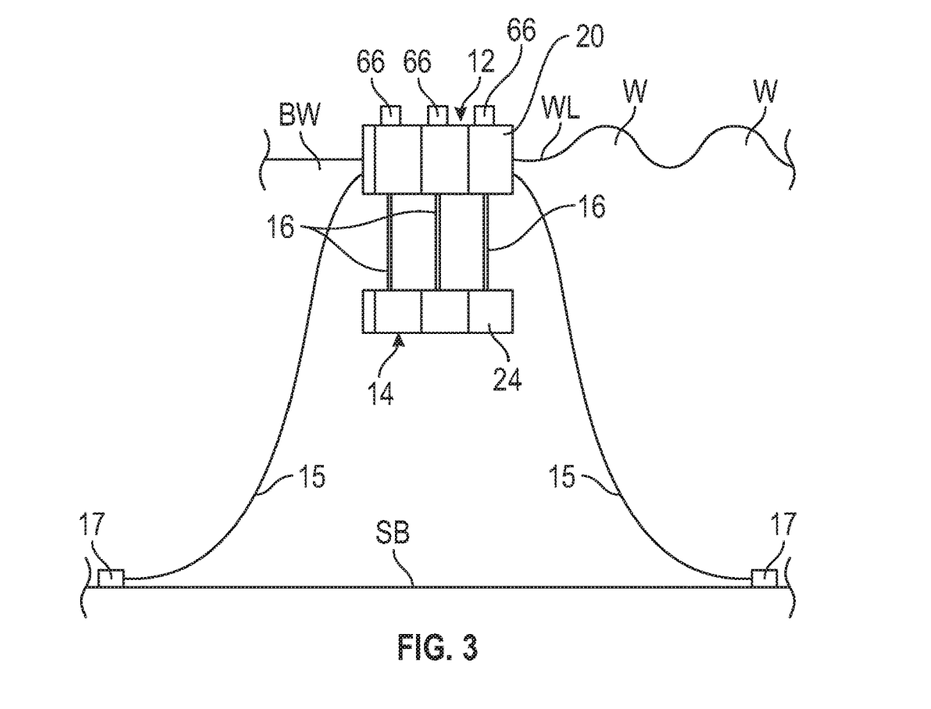
FIG. 3 is a side elevational view of the wave energy converter illustrated in FIG. 1 shown deployed in a body of water.

The first embodiment of the hull 12 illustrated in FIGS. 1 through 3 is cylindrical in shape, has a first end 12A (the upper end when viewing FIG. 1), a second end 12B (the lower end when viewing FIG. 1), a longitudinally extending axis A, and a centrally formed passageway 18 extending from the first end 12A to the second end 12B. Alternatively, the hull 12 may have an octagonal, hexagonal, or other multi-faceted cross-sectional shape. The illustrated hull 12 is further comprised of six hollow sections 20 described below. When assembled, to define the hull 12, the hollow sections 20 define a hollow chamber (not shown) within the hull 12. If desired, the hull 12 may include one or more external blisters 21, and one or more internal blisters 23 (see FIG. 2) to facilitate post-tensioning the assembled sections 20 with second or post-tensioning tendons 26, shown in FIG. 2 and described below. If desired, the hollow chamber (not shown) may be used as a ballast chamber.

The hull 12 may have any desired size that may be determined by the amount of electrical power desired to be produced by the WEC 10. For example, if the WEC is configured to produce 1 megawatt (MW) of electrical power, then the hull 12 may have a diameter within the range of about 20 m to about 40 m and a height within the range of about 5 m to about 8 m. Alternatively, the height of the hull 12 may be less than about 4 m or greater than about 8 m.

The heave plate 14 is similar to the hull 12, is cylindrical in shape, has a first end 14A (the upper end when viewing FIG. 1), a second end 14B (the lower end when viewing FIG. 1), the longitudinally extending axis A, and a centrally formed passageway 22 extending from the first end 14A to the second end 14B. The illustrated heave plate 14 is further comprised of six hollow sections 24 described below. Like the hull 12, the heave plate 14 may alternatively have an octagonal, hexagonal, or other multi-faceted cross-sectional shape. It will be understood however, that the sections may also be solid depending on buoyancy requirements.

The heave plate 14 may have any desired size that may be determined by the amount of electrical power desired to be produced by the WEC 10. For example, if the WEC is configured to produce 1 megawatt (MW) of electrical power, then the heave plate 14 may have a diameter within the range of about 20 m to about 40 m and a height within the range of about 2 m to about 6 m. It will be understood that the diameter and the height of the heave plate 14 may be about the same as the diameter and the height of the hull 12 or the diameter and the height of the heave plate 14 may be smaller than the diameter and the height of the hull 12.

In the illustrated embodiment, the passageway 22 is shown as being open at both the first end 14A and the second end 14B of the heave plate 14. Alternatively, the passageway 22 may be closed at one or both of the first end 14A and the second end 14B of the heave plate 14.

Figure 4:
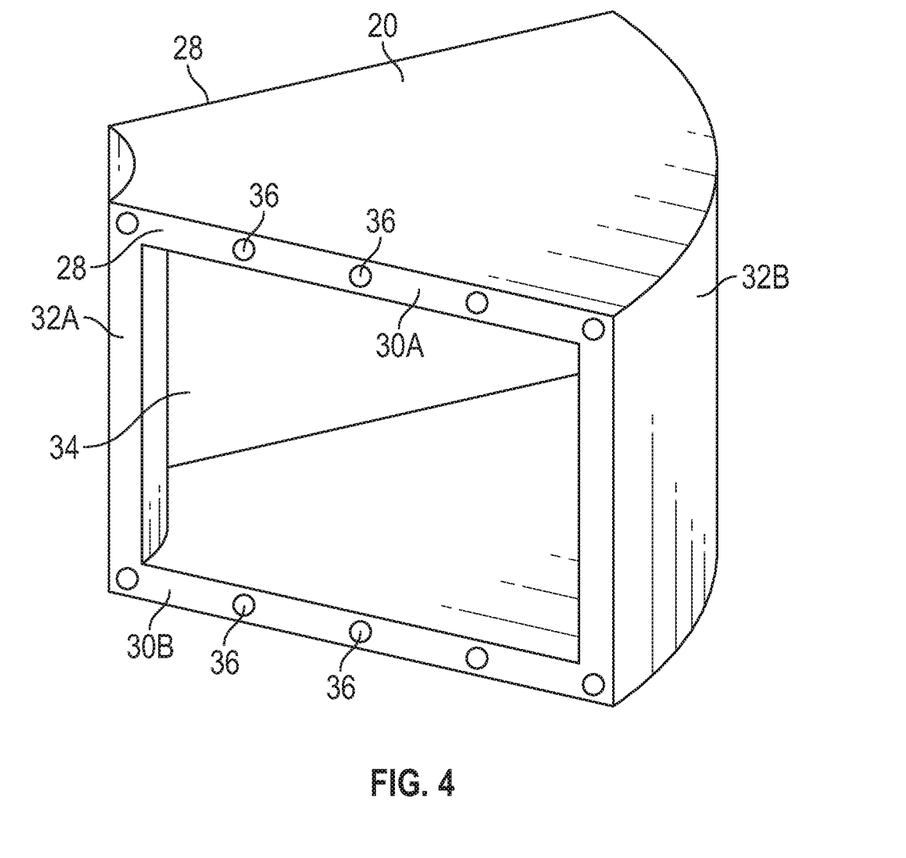
FIG. 4 is a perspective view of a first embodiment of a section of the hull illustrated in FIGS. 1 through 3.

Referring now to FIG. 4, a first embodiment of the hollow section 20 of the hull 12 is shown. The illustrated hollow section 20 wedge-shaped, has side mating faces 28, a first end wall 30A (the upper end when viewing FIG. 4), a second end wall 30B (the lower end when viewing FIG. 4), an inner circumferential wall 32A, an outer circumferential wall 32B, and a hollow interior cavity 34. A plurality of ducts 36 may extend through the first and second end walls 30A and 30B.

The illustrated hull 12 is shown being formed from six hollow sections 20. It will be understood however, that the hull 12 may be formed from more than six hollow sections 20 or less than six hollow sections 20.

Figure 5:
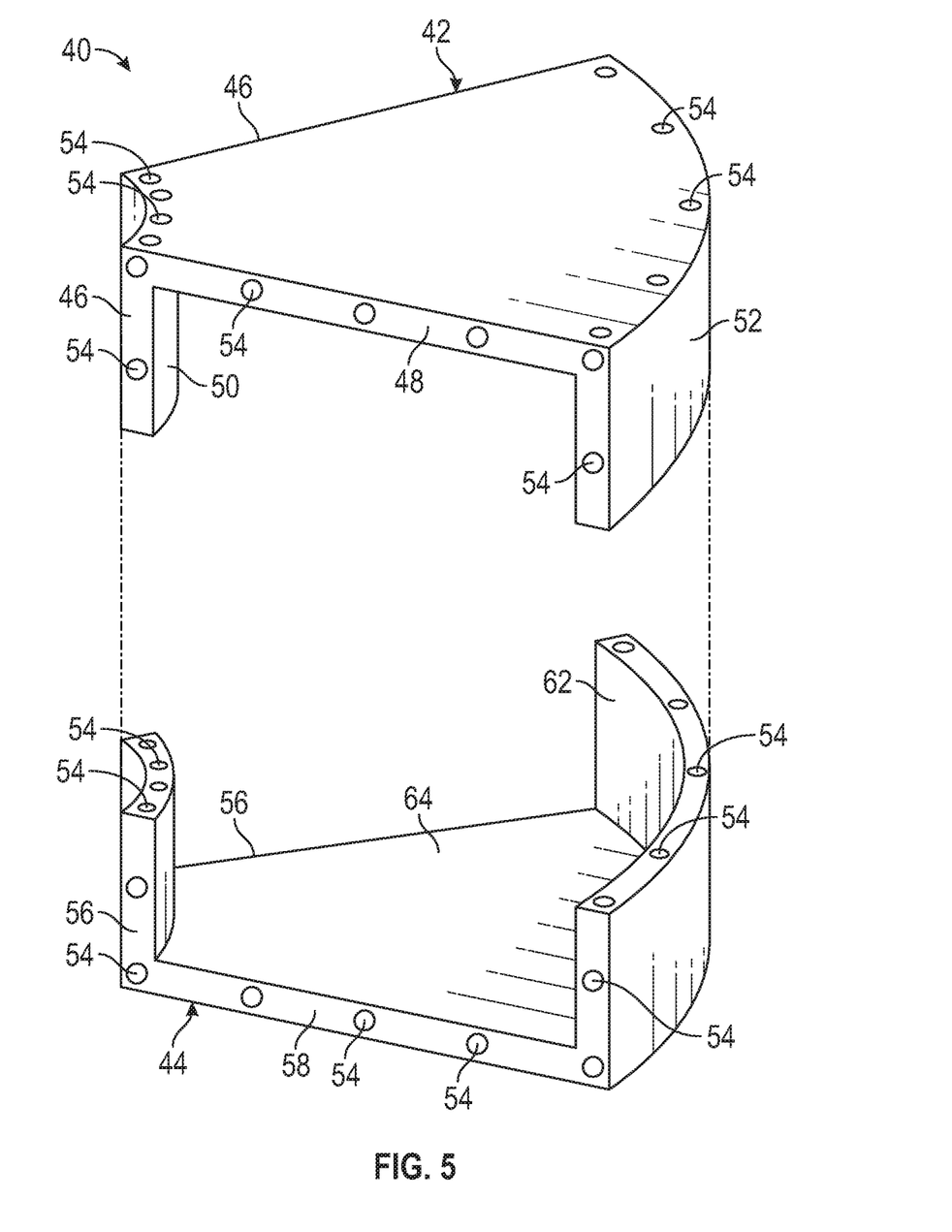
FIG. 5 is a perspective view of a second embodiment of a section of the hull illustrated in FIGS. 1 through 3.

Referring now to FIG. 5, a second embodiment of the hollow section of the hull 12 is shown at 40. The illustrated hollow section 40 wedge-shaped and is otherwise the same as the hollow section 20, except that the hollow section 40 is formed from two portions, a first portion 42 (the upper portion when viewing FIG. 5), and a second portion 44 (the lower portion when viewing FIG. 5). The first portion 42 has side mating faces 46, a first end wall 48 (the upper end when viewing FIG. 5), an inner circumferential wall 50, and an outer circumferential wall 52. A plurality of ducts 54 may extend through the first end wall 48. A plurality of the ducts 54 may also extend through the inner and outer circumferential walls 50 and 52, respectively.

Similarly, the second portion 44 has side mating faces 56, a second end wall 58 (the lower end when viewing FIG. 5), an inner circumferential wall 60, and an outer circumferential wall 62. A plurality of the ducts 54 may extend through the second end wall 58, and the inner and outer circumferential walls 60 and 62, respectively. When assembled together, the first and second portions 42 and 44 of the hollow section 40 define a hollow interior cavity 64.

Embodiments of the heave plate sections 24 may be otherwise the same as the embodiments of the hollow sections 20 and 40, except in size, and will not be described further.

The hollow sections 20, 24, and 40, and the hollow section portions 42 and 44 may be formed from pre-stressed reinforced concrete. Any desired process may be used to manufacture the hollow sections 20, 24, and 40, and the hollow section portions 42 and 44, such as a spun concrete process, with conventional concrete forms, or with reusable concrete forms in a semi-automated process such as used in the precast concrete industry. The concrete of the hollow sections 20, 24, and 40, and the hollow section portions 42 and 44 may be reinforced with any conventional reinforcement material, such as high tensile steel cable, high-strength post-tensioning rods, and high tensile steel reinforcement bars or REBAR. Alternatively, the hollow sections 20, 24, and 40, and the hollow section portions 42 and 44 may be formed from FRP, or combinations of pre-stressed reinforced concrete and FRP.

When formed and cured, the hollow sections 20 and 40 may be assembled and post-tensioned circumferentially to define the hull 12. Similarly, when formed and cured, the hollow sections 24 may be assembled and post-tensioned circumferentially to define the heave plate 14. The hollow sections 20, 24, and 40 may be post-tensioned by any desired post-tensioning method, thus applying a circumferential compressive force between adjacent hollow sections 20, 24, and 40. For example, the post-tensioning tendons 26 (shown schematically in FIG. 2) may be extended through ducts 54, stressed, and suitably anchored to the hull 12 or the heave plate 14 in a conventional manner, such as on the face 28 of one or more of the sections 20, and at the blister 21. Because the post-tensioning tendons 26 are maintained in a permanently stressed condition, they apply a compressive force on the concrete of the adjacent hollow sections 20, 24, and 40.

It will be understood that one post-tensioning tendon 26 may extend circumferentially through each duct 54, or a plurality of post-tensioning tendons 26 may extend through each duct 54, such as to connect two or more adjacent sections 20 together. Additionally, any of the two or more adjacent sections 20 connected together by a post-tensioning tendon 26 may further be attached to an adjacent one or more sections 20 similarly attached together by a post-tensioning tendon 26.

Similarly, when formed and cured, the hollow section portions 42 and 44 may be post-tensioned together to define the hollow section 40. Post-tensioning of the hollow section portions 42 and 44 may be accomplished by extending the post-tensioning tendons 26 through the ducts 54 formed in the inner circumferential walls 50 and 60 and the ducts 54 formed in the outer circumferential walls 52 and 62, stressed, and suitably anchored in a conventional manner. The post-tensioning tendons 26 may be formed from any desired material, such as high tensile steel cable, and carbon fiber.

The connecting tendons 16 may also be formed from any desired material, such as high tensile steel cable, and carbon fiber. As described above, the hull 12 and the heave plate 14 are connected by a plurality of the connecting tendons 16. In the illustrated embodiment, three connecting tendons 16 are shown arranged radially about the axis A. Alternatively, that the hull 12 and the heave plate 14 may be connected by more than three connecting tendons 16 or less than three connecting tendons 16.

The connecting tendons 16 may have any desired length, such as within the range of about 10 m to about 50 m.

The connecting tendons 16 may be attached to each of the heave plate 14 and the hull 12 by any conventional method. Power take offs (66), schematically illustrated at 66, are connected to first ends of the connecting tendons 16 (the upper ends when viewing FIGS. 1 and 3) and are mounted to the first end 12A of the hull 12.

It will be understood that the power of waves W (see FIG. 3) in the body of water BW in which the WEC 10 is deployed may be converted into electricity by the power take-offs 66. In the illustrated embodiment of the WEC 10, the waves W cause the hull 12 to move relative to the heave plate 14. This relative motion, and the load generated between the hull 12 and the heave plate 14, is used to generate electric power though the power take offs 66. The electricity generated may then be transmitted to a desired location, such as via an undersea cable. The wave power may also be used to produce mechanical energy such as to pump water.

The power take-offs 66 may be any desired power take-off, such as for example, a high pressure oil hydraulic power take-off. Alternatively, other types of power take offs may be used. Additionally, other devices for converting wave energy into electricity may be used, including air turbines, low head water turbines, and linear generators.

The hull 12 and the heave plate 14 may be manufactured or assembled on shore, in a graving dock, afloat, or in any combination thereof. In a first embodiment of a method of manufacturing and assembling the WEC 10, the hollow sections 20, 24, and 40 may be formed in graving dock, dry dock, or cofferdam (not shown). The hollow sections 20 or 40 may then be assembled in the graving dock to form the hull 12, and the hollow sections 24 may be assembled in the graving dock to form the heave plate 14. The graving dock may then be flooded in a conventional manner and the hull 12 and/or the heave plate 14 floated to an assembly area, such as an assembly area near a pier or dock (not shown), where the WEC 10 may be assembled.

In a second embodiment of the method of manufacturing and assembling the WEC 10, the hollow sections 20, 24, and 40 may be formed from reinforced concrete in a manufacturing step outside the graving dock, such as in an on-shore assembly area, and moved to the graving dock. Once moved within the graving dock, the hollow sections 20, 24, and 40 may be assembled to form the hull 12 and the heave plate 14, or portions thereof, and post-tensioned as described above. It will be understood that the graving dock may be of any desired size, such that two or more WECs 10 may be simultaneously formed. The hull 12 and the heave plate 14 assembled in the graving dock may alternatively be floated to a floating assembly area where the WEC 10 will be assembled. The completed WEC 10 may then be towed to a location where the WEC 10 will be deployed and operated.

Figure 12A:
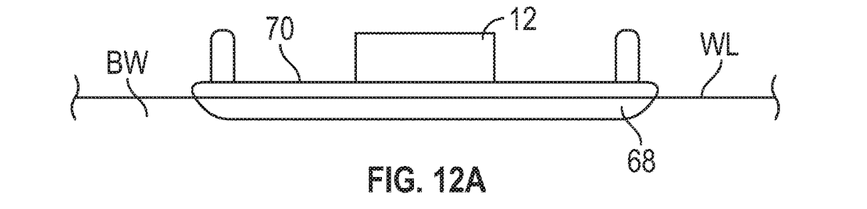
FIG. 12A is a side elevational view of a semi-submersible launch barge showing the hull illustrated in FIGS. 1 through 3 positioned thereon.
Figure 12B:
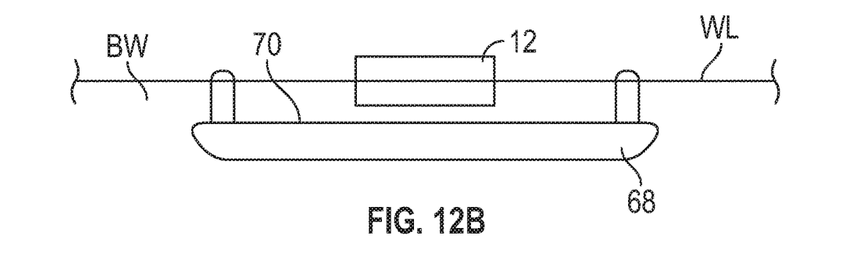
FIG. 12B is a side elevational view of the semi-submersible launch barge illustrated in FIG. 12A showing the hull illustrated in FIGS. 1 through 3 being launched therefrom.

In a third embodiment of the method of manufacturing and assembling the WEC 10, the hollow sections 20, 24, and 40 may be formed from reinforced concrete on a semi-submersible launch barge 68, as shown in FIGS. 12A and 12B. The hollow sections 20, 24, and 40 may be formed from pre-stressed reinforced concrete by any of the methods described above. When formed and cured, the hollow sections 20 and 40 may be assembled and post-tensioned circumferentially to define the hull 12, and the hollow sections 24 may be assembled and post-tensioned circumferentially to define the heave plate 14.

The hull 12 and the heave plate 14 assembled on the semi-submersible launch barge 68 may be deployed into the body of water BW by adjusting ballast in the semi-submersible launch barge 68 to cause the semi-submersible launch barge 68 to move downwardly in the body of water BW such that an upwardly facing deck 70 of the semi-submersible launch barge 68 is below, and not in contact with, the floating hull 12 and/or the floating heave plate 14. Once removed from the deck 70 of the semi-submersible launch barge 68 and floating in the body of water BW, the hull 12 and/or the heave plate 14 may be floated to an assembly area, such as the assembly area near a pier or dock (not shown), where the WEC 10 may be assembled, and subsequently towed to a location where the WEC 10 will be deployed and operated.

Figure 13A:
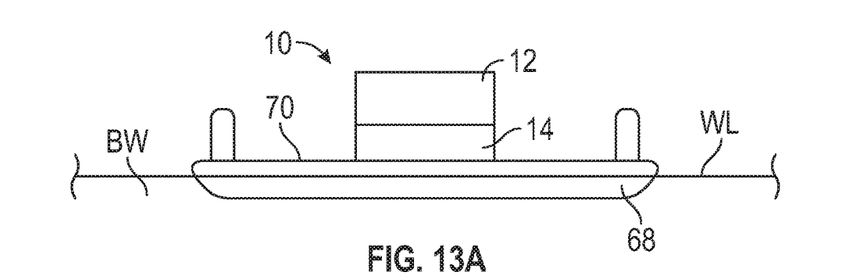
FIG. 13A is a side elevational view of a semi-submersible launch barge showing the wave energy converter illustrated in FIGS. 1 and 3 positioned thereon.
Figure 13B:
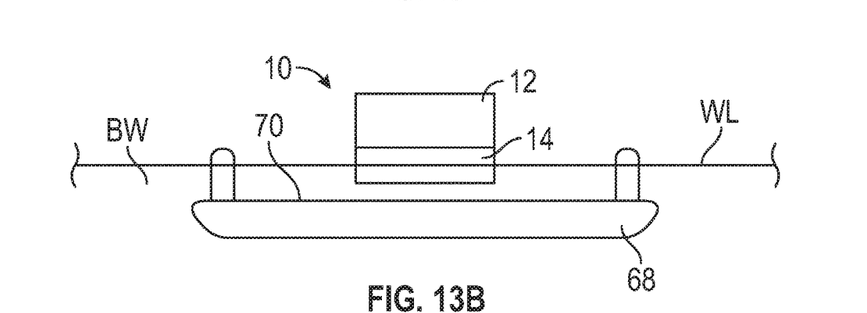
FIG. 13B is a side elevational view of the semi-submersible launch barge illustrated in FIG. 13A showing the wave energy converter illustrated in FIGS. 1 and 3 being launched therefrom.
Figure 13C:
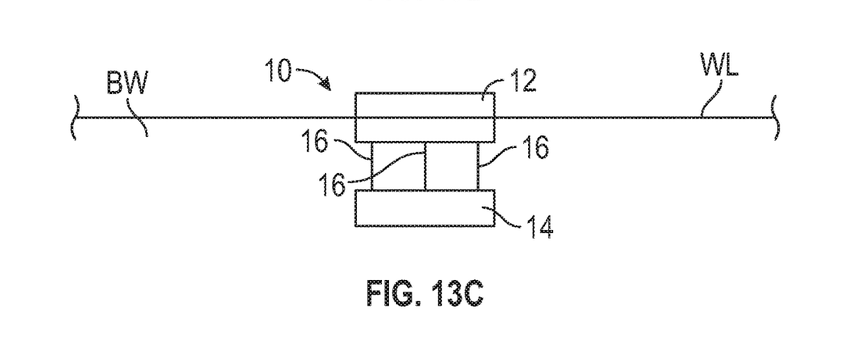
FIG. 13C is a side elevational view of the wave energy converter illustrated in FIGS. 13A and 13B and shown deployed in a body of water.

Alternatively, as shown in FIGS. 13A, 13B, and 13C, both the hull 12 and the heave plate 14 may be assembled on the semi-submersible launch barge 68 and the WEC 10 subsequently assembled on the semi-submersible launch barge 68 from the hull 12 and the heave plate 14. The WEC 10 may be deployed into the body of water BW by adjusting ballast in the semi-submersible launch barge 68 to cause the semi-submersible launch barge 68 to move downwardly in the body of water BW such that the upwardly facing deck 70 of the semi-submersible launch barge 68 is below, and not in contact with, the floating WEC 10. The completed WEC 10 may then be towed to a location where the WEC 10 will be deployed and operated.

It will be understood that if the semi-submersible launch barge 68 is used to launch only portions of the WEC 10, such as the hull 12 and/or the heave plate 14, prior to completion of the WEC 10, any remaining components may be assembled while the hull 12 and/or the heave plate 14 are floating in the body of water BW near a pier or dock (not shown), where the WEC 10 may be assembled.

Figure 6:
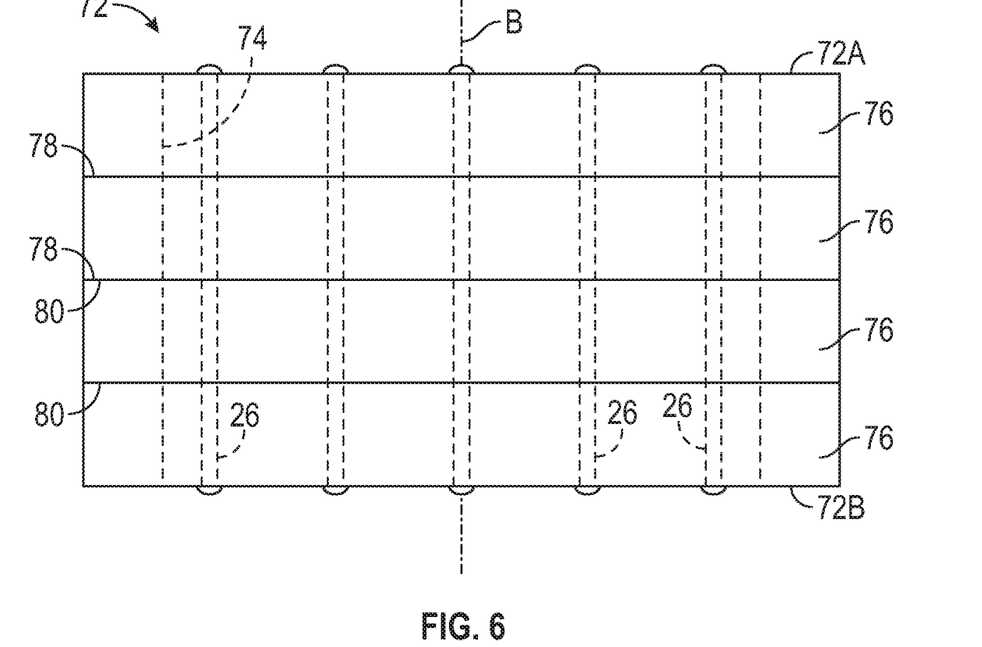
FIG. 6 is a side elevational view of second embodiment of the hull of the wave energy converter shown in FIGS. 1 and 3.
Figure 7:
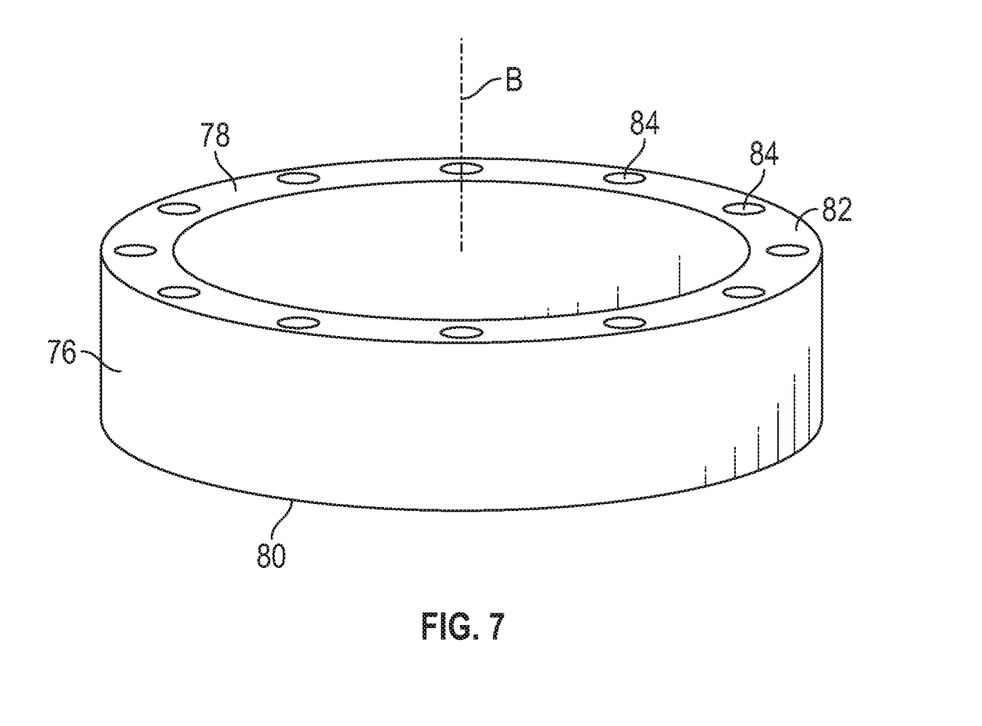
FIG. 7 is a perspective view of an annular section of the hull illustrated in FIG. 6.

A second embodiment of the hull 72 illustrated in FIGS. 6 and 7. The hull 72 cylindrical in shape, has a first end 72A (the upper end when viewing FIG. 6), a second end 72B (the lower end when viewing FIG. 6), a longitudinally extending axis B, and a centrally formed passageway 74 extending from the first end 72A to the second end 72B. The illustrated hull 72 is further comprised of four annular sections 76 described below.

Like the hull 12, the hull 72 may have any desired size that may be determined by the amount of electrical power desired to be produced by the WEC 10. For example, if the WEC is configured to produce 1 MW of electrical power, then the hull 72 may have a diameter within the range of about 20 m to about 40 m and a height within the range of about 5 m to about 8 m. Alternatively, the height of the hull 72 may be less than about 4 m or greater than about 8 m.

A WEC, such as the WEC 10, may be formed with the hull 72 and a heave plate (not shown) formed in the same manner as the hull 72 and will not be further described herein.

In the illustrated embodiment, the passageway 74 is shown as being open at both the first end 72A and the second end 72B of the hull 72. Alternatively, the passageway 74 may be closed at one or both of the first end 72A and the second end 72B of the hull 72. It will be further understood that a heave plate (not shown) formed in the same manner as the hull 72 may include a centrally formed and longitudinally extending passageway formed therein and extending from a first end to a second end thereof. Like the passageway 74, the passageway of the heave plated (not shown) may be open at both ends, or may be closed as one or both ends.

Referring now to FIG. 7, an embodiment of the annular section 76 of the hull 72 is shown. The illustrated annular section 76 has a first axial end face 78 (the upper end when viewing FIG. 7), a second axial end face 80 (the lower end when viewing FIG. 7), and a circumferentially extending wall 82. A plurality of ducts 84 may extend through the wall 82.

The illustrated hull 72 is shown being formed from four annular sections 76. It will be understood however, that the hull 72 may be formed from more than four annular sections 76 or less than four annular sections 76.

The hull 72 and associated heave plate (not shown) may be formed from pre-stressed reinforced concrete according to any of the methods described above. The hull 72 may also be manufactured or assembled on shore, in a graving dock, afloat, or in any combination thereof as described in detail regarding the hull 12.

When formed and cured, the annular sections 76 may be assembled and post-tensioned longitudinally to define the hull 72. The annular sections 76 may be post-tensioned by any desired post-tensioning method, thus applying a compressive force between adjacent annular sections 76. For example, the post-tensioning tendons 26, such as shown in FIGS. 2 and 6, may be extended through the ducts 84, stressed, and suitably anchored to the first end 72A and the second end 72B of the hull 72 in a conventional manner. Because the post-tensioning tendons 26 are maintained in a permanently stressed condition, they apply a compressive force on the concrete of the adjacent annular sections 76.

Figure 8:
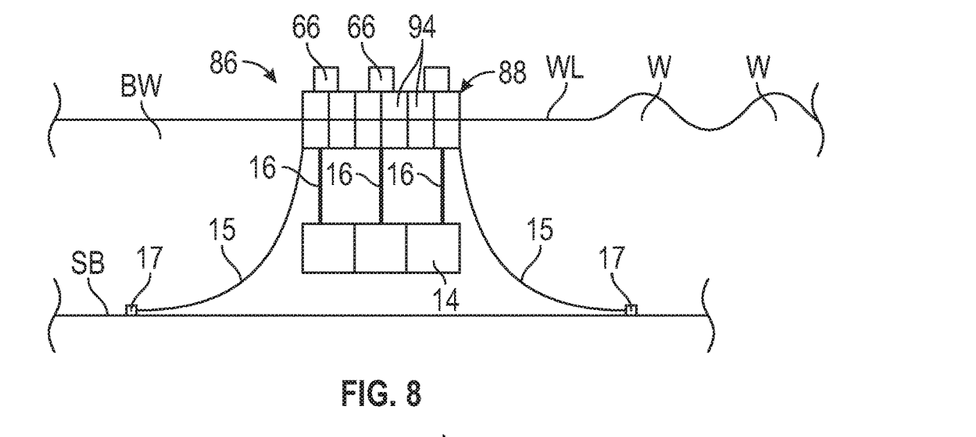
FIG. 8 is a side elevational view of a second embodiment of the wave energy converter in accordance with this invention and shown deployed in a body of water.

A second embodiment of the WEC is shown at 86 in FIG. 8. The WEC 86 is shown deployed in a body of water BW, and anchored to the sea bed SB of the body of water BW. The WEC 86 includes a third embodiment of the hull 88 illustrated in FIGS. 8 through 10 and the heave plate 14, described above in detail. In the illustrated embodiment, the hull 88 and the heave plate 14 are connected by a plurality of the connecting tendons 16.

Mooring lines 15 may be attached to the hull 88 of the WEC 86 and further attached to the anchors 17 in the seabed SB to limit to movement of the WEC 86 on the body of water BW.

Figure 9:
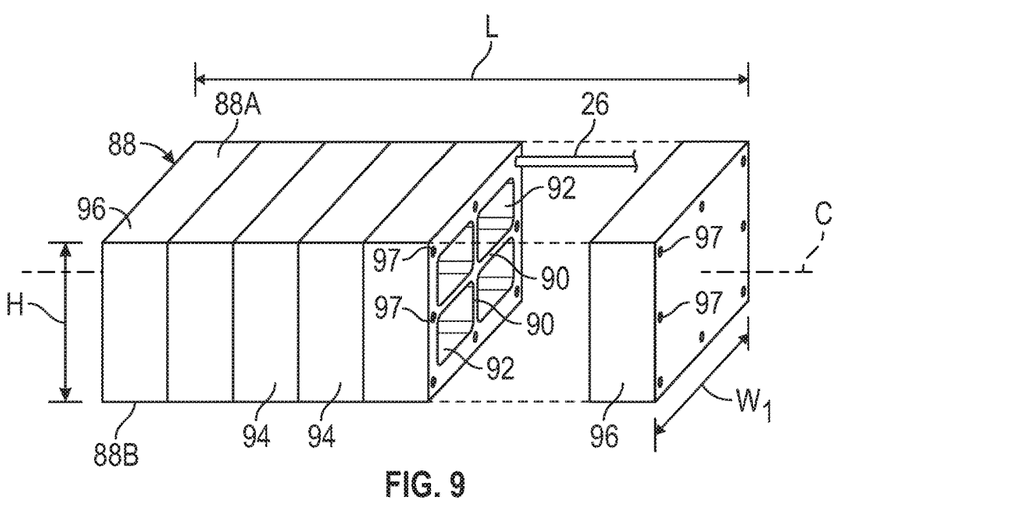
FIG. 9 is a partially exploded perspective view of a third embodiment of the hull shown in FIG. 8.

The embodiment of the hull 88 illustrated in FIGS. 8 and 9 has a rectangular cross-section, has a first end 88A (the upper end when viewing FIG. 9), a second end 88B (the lower end when viewing FIG. 9), a longitudinally extending axis C, and a plurality of longitudinally extending bulkheads 90. The bulkheads 90 divide the hull 88 into four longitudinally extending hollow chambers 92. If desired, the hollow chambers 92 may be used as ballast chambers.

The illustrated hull 88 is comprised of four body sections 94 and two end sections 96, described below. Each body section 94 includes the plurality of longitudinally extending bulkheads 90 which divide the body sections 94 into portions of the four longitudinally extending hollow chambers 92. It will be understood that the end sections 96 include the same arrangement of the bulkheads 90 as the body sections 94. The hull 88 may have any desired size that may be determined by the amount of electrical power desired to be produced by the WEC 10. For example, if the WEC is configured to produce 1 MW of electrical power, then the hull 88 may have a length L within the range of about 10 m to about 50 m, a width $W_1$ within the range of about 10 m to about 50 m, and a height H with within the range of about 3 m to about 20 m.

The outer walls of the hull 88 may have a thickness within the range of about 0.305 m to about 0.762 m. Alternatively, the outer walls may have a thickness less than about 0.305 m or greater than about 0.762 m. The bulkheads 90 may have a thickness within the range of about 152 mm to about 254 mm. Alternatively, the bulkheads 90 may have a thickness less than about 152 mm or greater than about 254 mm. As shown in FIG. 9, the end sections 96 are closed.

The illustrated hull 88 is shown being formed from four body sections 94. It will be understood however, that the hull 88 may be formed from more than four body sections 94 or less than four body sections 94.

Figure 10:
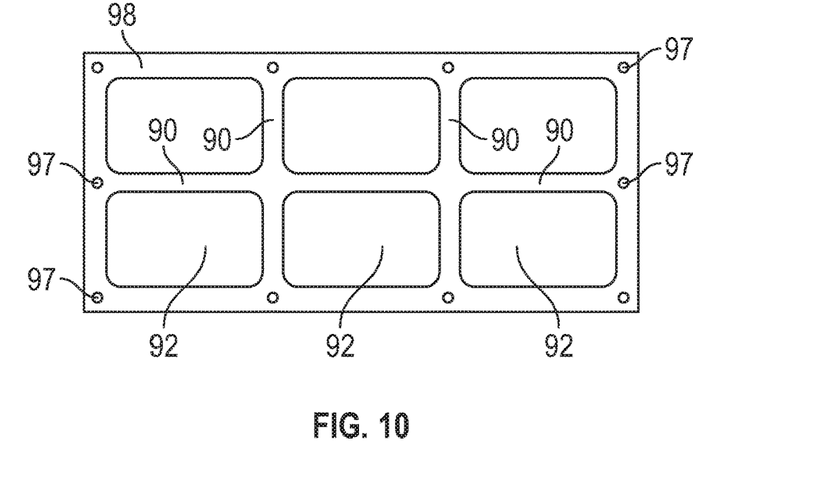
FIG. 10 is an end elevational view of an alternate embodiment of a body section of the hull illustrated in FIGS. 8 and 9.

An alternate embodiment of the body section 98 is shown in FIG. 10. In the body section 98, the plurality of longitudinally extending bulkheads 90 divides the body section 98 into six chambers 92. Thus, when the body section 98 and corresponding end sections (not shown) are assembled to form the hull, the bulkheads 90 will also divide the hull into six longitudinally extending hollow chambers 92. Although not illustrated, it will be understood that the corresponding end sections (not shown) will include the same arrangement of the bulkheads 90 as the body sections 98.

The hulls 88 and 98 may be formed from pre-stressed reinforced concrete according to any of the methods described above. The hulls 88 and 98 may also be manufactured or assembled on shore, in a graving dock, afloat, or in any combination thereof as also described in detail above.

When formed and cured, the body sections 94 and end sections 96 of the hull 88, and the body sections 98 and corresponding end sections (not shown), may be assembled and post-tensioned longitudinally to define the hull 88. The body sections 94 and end sections 96 may be post-tensioned by any desired post-tensioning method, thus applying a compressive force between adjacent sections 94 and 96. For example, the post-tensioning tendons 26, only one of which is shown in FIG. 9 for clarity, may be extended through ducts 97, stressed, and suitably anchored to outside surfaces of the end sections 96 in a conventional manner. Because the post-tensioning tendons 26 are maintained in a permanently stressed condition, they apply a compressive force on the concrete of the adjacent body sections 94 and end sections 96.

Figure 11:
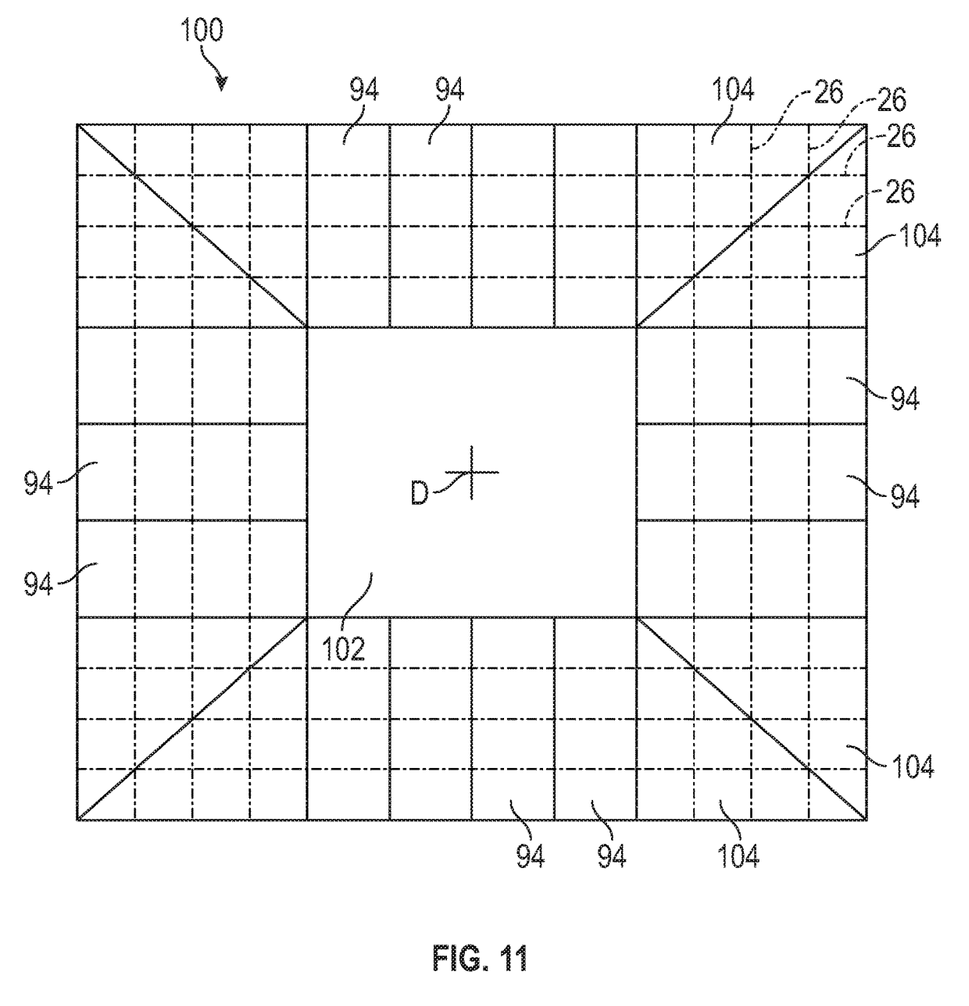
FIG. 11 is a top plan view of a fourth embodiment of the hull in accordance with this invention.

A fourth embodiment of the hull is illustrated at 100 in FIG. 11. The hull 100 includes a plurality of the body sections 94 arranged to define a rectangular hull 100 having a longitudinally extending axis D, and a centrally formed passageway 102 extending therethrough. Connecting sections 104 define corners of the rectangular hull 100.

The connecting sections 104 have a triangular cross-section and may be formed from pre-stressed reinforced concrete according to any of the methods described above. The connecting sections 104 may also be manufactured or assembled on shore, in a graving dock, afloat, or in any combination thereof as also described in detail above.

When formed and cured, the body sections 94 and the connecting sections 104 of the hull 100 may be post-tensioned by any desired post-tensioning method, thus applying a compressive force between adjacent sections 94 and 104. For example, the post-tensioning tendons 26 may be extended through ducts (not shown), stressed, and suitably anchored to outside surfaces of the connecting sections 104 in a conventional manner. Because the post-tensioning tendons 26 are maintained in a permanently stressed condition, they apply a compressive force on the concrete of the adjacent body sections 94 and the connecting sections 104.

It will be understood that a heave plate (not shown) may be formed substantially the same as the hull 100 and may be of the same or of a different size. Such an embodiment of the heave plate, although not illustrated, may be otherwise the same as the embodiment of the hull 100 and will not be described further.

Figure 14:
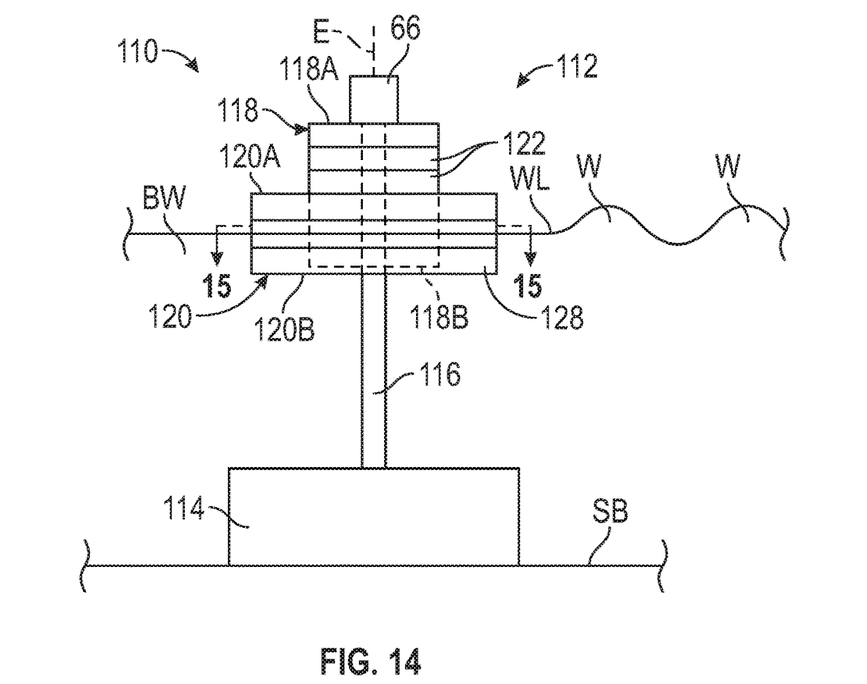
FIG. 14 is a side elevational view of a third embodiment of a wave energy converter shown deployed in a body of water.
Figure 15:
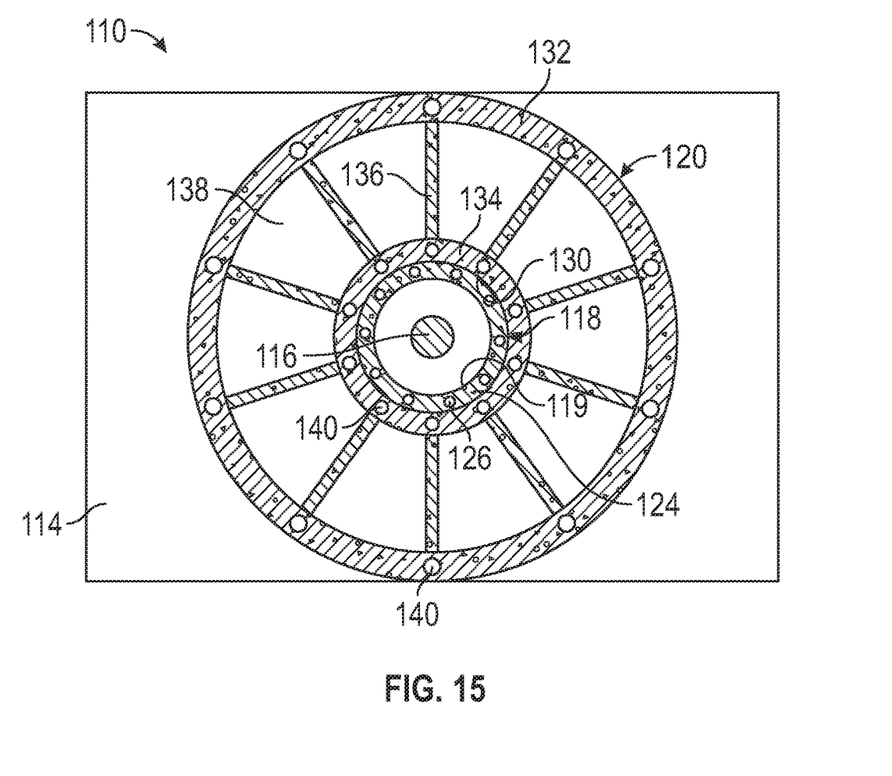
FIG. 15 is a cross-sectional view taken along the line 15-15 of FIG. 14.
Figure 16:
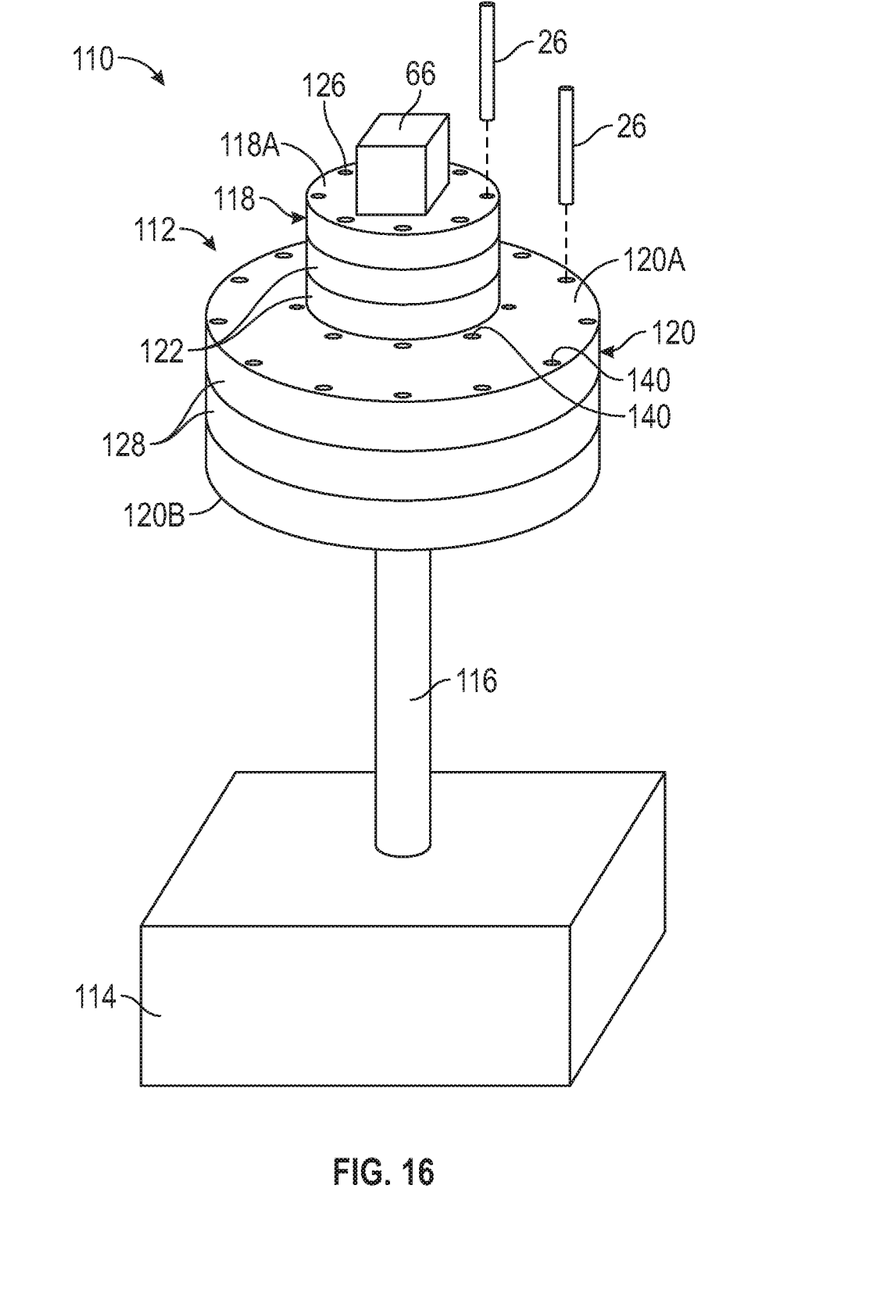
FIG. 16 is a perspective view of the wave energy converter illustrated in FIGS. 14 and 15.

A third embodiment of the WEC is shown at 110 in FIGS. 14 through 16. The WEC 110 is shown deployed in a body of water BW and anchored to the sea bed SB of the body of water BW. The WEC 110 is a point absorber type WEC and includes a buoy 112 connected to a foundation 114 by a rod or cable 116, and a longitudinally extending axis E.

In the illustrated WEC 110, the foundation 114 is positioned on the sea bed SB and has a size and mass capable of anchoring the WEC 110 to the sea bed SB. The foundation 114 may be formed from any desired material, such as pre-stressed reinforced concrete according to any of the methods described above. The foundation 114 may also be manufactured or assembled on shore, in a graving dock, afloat, or in any combination thereof as also described in detail above. Alternatively, the foundation 114 may be formed from steel or a combination of pre-stressed reinforced concrete and steel.

The cable 116 may be formed from any desired material, such as high tensile steel cable, and carbon fiber.

The buoy 112 includes a stationary member 118 and a float 120 slidably mounted thereto. A power take off 66 is connected to a first end of the cable 116 (the upper end when viewing FIGS. 14 and 16), is mounted to a first end 118A of the stationary member 118, and is further connected to the float 120.

The stationary member 118 is cylindrical in shape, has a closed first end 118A (the upper end when viewing FIGS. 14 and 16), a closed second end 118B (the lower end when viewing FIG. 14), and a centrally formed passageway 119 extending from the first end 118A to the second end 118B. The illustrated stationary member 118 is further comprised of a plurality of annular sections 122 described below.

As best shown in FIG. 15, the annular section 122 is similar to the annular section 76 described above and has a circumferentially extending wall 124. A plurality of ducts 126 may extend through the wall 124. It will be understood that the stationary member 118 may be formed from desired number of annular sections 122.

The annular sections 122 may be formed from pre-stressed reinforced concrete according to any of the methods described above. The stationary member 118 and its component annular sections 122 may also be manufactured or assembled on shore, in a graving dock, afloat, or in any combination thereof as described in detail regarding the hull 12.

When formed and cured, the annular sections 122 may be assembled and post-tensioned longitudinally to define the stationary member 118. The annular sections 122 may be post-tensioned by any desired post-tensioning method, thus applying a compressive force between adjacent annular sections 122. For example, the post-tensioning tendons 26, best shown in FIG. 16, may be extended through the ducts 126, stressed, and suitably anchored to the first end 118A and the second end 118B of the stationary member 118 in a conventional manner. Because the post-tensioning tendons 26 are maintained in a permanently stressed condition, they apply a compressive force on the concrete of the adjacent annular sections 122.

The float 120 is cylindrical in shape, has a closed first end 120A (the upper end when viewing FIGS. 14 and 16), a closed second end 120B (the lower end when viewing FIG. 14), and a centrally formed passageway 130 extending from the first end 120A to the second end 120B. The illustrated float 120 is further comprised of a plurality of annular sections 128 described below. When the buoy 112 is assembled, the stationary member 118 is positioned within the passageway 130 of the float 120 such that the float 120 can slide relative to the stationary member 118, i.e., along the axis E.

As best shown in FIG. 15, the annular section 128 has two concentric walls, including a first or outer circumferentially extending wall 132 and a second or inner circumferentially extending wall 134. The walls 132 and 134 are connected by a plurality of radially extending bulkheads 136 defining hollow chambers 138 therebetween. A plurality of ducts 140 may extend through each of the walls 132 and 134. It will be understood that the float 120 may be formed from any desired number of annular sections 128. If desired, the hollow chambers 138 may be used as ballast chambers.

The annular sections 128 may be formed from pre-stressed reinforced concrete according to any of the methods described above. The float 120 and its component annular sections 128 may also be manufactured or assembled on shore, in a graving dock, afloat, or in any combination thereof as described in detail regarding the hull 12.

When formed and cured, the annular sections 128 may be assembled and post-tensioned longitudinally to define the float 120. The annular sections 128 may be post-tensioned by any desired post-tensioning method, thus applying a compressive force between adjacent annular sections 128. For example, the post-tensioning tendons 26, best shown in FIG. 16, may be extended through the ducts 140, stressed, and suitably anchored to the first end 120A and the second end 120B of the float 120 in a conventional manner. Because the post-tensioning tendons 26 are maintained in a permanently stressed condition, they apply a compressive force on the concrete of the adjacent annular sections 128.

The float 120 may have any desired size that may be determined by the amount of electrical power desired to be produced by the WEC 10. For example, if the WEC is configured to produce 1 MW of electrical power, then the float 120 may have a diameter within the range of about 20 m to about 40 m and a height within the range of about 5 m to about 8 m. Alternatively, the height of the float 120 may be less than about 4 m or greater than about 8 m.

It will be understood that the power of waves W (see FIG. 14) in the body of water BW in which the WEC 110 is deployed may be converted into electricity by the power take-offs 66. In the illustrated embodiment of the WEC 110, the float 120 is caused to move along the stationary member 118, i.e., along the axis E as the waves W rise and fall waves cause the float 120 to move relative to the heave plate 14. This relative motion, and the load generated between the float 120 and the stationary member 118, is used to generate electric power though the power take off 66.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wave energy converter (10) capable of floating on a body of water (BW) and moving in response to waves (W) occurring in the body of water (BW), the wave energy converter (10) comprising a hull (12) connected to a heave plate (14), characterized in that:
   the hull (12) is formed from reinforced concrete;
   a plurality of connecting tendons (16) extending between the hull (12) and the heave plate (14); and
   a power take off (66) attached to each connecting tendon (16);
   wherein the hull (12) is formed from a plurality of wedge-shaped hollow sections (20); and
   wherein each wedge-shaped hollow section (20) includes a first portion (42) attached to a second portion (44), wherein the first portion (42) has side mating faces (46), a first end wall (48), an inner circumferential wall (50), an outer circumferential wall (52), and a plurality of ducts (54) extending through the first end wall (48) and the inner and outer circumferential walls (50, 52), and wherein the second portion (44) has side mating faces (56), a second end wall (58), an inner circumferential wall (60), an outer circumferential wall (62), and a plurality of the ducts (54) extending through the second end wall (58) and the inner and outer circumferential walls (60, 62).

2. The wave energy converter (10) according to claim 1, the hull (12) further including at least one post-tensioning tendon (26) extending through each of the plurality of circumferentially extending ducts (36) in the first and second end walls (30A, 30B), the post-tensioning tendons (26) stressed and anchored to a portion of the hull (12) and connecting at least two adjacent wedge-shaped hollow sections (20) together.

3. The wave energy converter (10) according to claim 2, wherein when assembled to form the hull (12), the plurality of hollow sections (20) define a hollow chamber within the assembled hull (12).

4. A wave energy converter (10) capable of floating on a body of water (BW) and moving in response to waves (W) occurring in the body of water (BW), the wave energy converter (10) comprising a hull (12) connected to a heave plate (14), characterized in that:
- the hull (12) is formed from reinforced concrete;
- a plurality of connecting tendons (16) extending between the hull (12) and the heave plate (14); and
- a power take off (66) attached to each connecting tendon (16);
- wherein the heave plate (14) is formed from a plurality of wedge-shaped hollow sections (24), wherein each wedge-shaped hollow section (24) has side mating faces (28), a first end wall (30A), a second end wall (30B), an inner circumferential wall (32A), an outer circumferential wall (32B), and a hollow interior cavity (34), and wherein a plurality of ducts (36) extend circumferentially through the first and second end walls (30A, 30B), the heave plate (14) further including at least one post-tensioning tendon (26) extending through each of the plurality of circumferentially extending ducts (36) in the first and second end walls (30A, 30B), the post-tensioning tendons (26) stressed and anchored to a portion of the heave plate (14) and connecting at least two adjacent wedge-shaped hollow sections (22) together, and wherein when assembled to form the heave plate (14), the plurality of hollow sections (24) define a hollow chamber within the assembled heave plate (14).

5. A wave energy converter (110) capable of floating on a body of water (BW) and moving in response to waves (W) occurring in the body of water (BW), the wave energy converter (110) comprising a buoy (112) anchored to a bed (SB) of the body of water (BW), characterized in that:
- the buoy (112) is formed from pre-stressed reinforced concrete and comprises a stationary member (118) and a float (120) slidably mounted to the stationary member (118);
- a foundation (114) configured to rest on the bed (SB) of the body of water (BW) and to anchor the wave energy converter (110) to the bed (SB) of the body of water (BW);
- a rod (116) extending between the buoy (112) and the foundation (114);
- a power take off (66) attached to the rod (116) and to the float (120);
- wherein the stationary member (118) has a closed first end (118A), a closed second end (118B), and a centrally formed passageway (119) extending from the first end (118A) to the second end (118B), includes a plurality of annular sections (122), and is cylindrical in shape;
- wherein each annular section (122) has a circumferentially extending wall (124) and a plurality of ducts (126) extending through the circumferentially extending wall (124);
- wherein the float (120) has a closed first end (120A), a closed second end (120B), and a centrally formed passageway (130) extending from the first end (120A) to the second end (120B), and wherein the float (120) includes a plurality of annular sections (128); and
- wherein the stationary member (118) is mounted within the passageway (130) of the float (120).

6. The wave energy converter (110) according to claim 5, wherein the float (120) is cylindrical in shape.

7. The wave energy converter (110) according to claim 5, wherein each annular section (128) has two concentric walls including an outer circumferentially extending wall (132), and an inner circumferentially extending wall (134), wherein the outer circumferentially extending wall (132) and the inner circumferentially extending wall (134) are connected by a plurality of radially extending bulkheads (136) defining hollow chambers (138) therebetween, and wherein a plurality of ducts (14) extend through each of the outer circumferentially extending wall (132) and the inner circumferentially extending wall (134).

8. The wave energy converter (110) according to claim 7, wherein the float (120) is cylindrical in shape.

9. The wave energy converter (110) according to claim 5, wherein when the stationary member (118) and the float (120) are assembled to form the buoy (112), the stationary member (118) is positioned within the passageway (130) of the float (120) such that the float (120) can slide relative to the stationary member (118).

10. The wave energy converter (110) according to claim 5, wherein the stationary member (118) further includes at least one post-tensioning tendon (26) extending through each of the plurality of ducts (126) in the circumferentially extending wall (124), the post-tensioning tendons (26) stressed and anchored to a portion of the stationary member (118).

11. The wave energy converter (110) according to claim 7, wherein the float (120) further includes at least one post-tensioning tendon (26) extending through each of the plurality of ducts (140) in the outer circumferentially extending wall (132) and the inner circumferentially extending wall (134), the post-tensioning tendons (26) stressed and anchored to a portion of the float (120).

12. A hull (12) for a wave energy converter (10) and configured for attachment to a heave plate (14), the wave energy converter (10) including a plurality of connecting tendons (16) extending between the hull (12) and the heave plate (14), and a power take off (66) attached to each connecting tendon, the wave energy converter (10) capable of floating on a body of water (BW) and moving in response to waves (W) occurring in the body of water (BW), the hull (12) characterized in that:
- the hull (12) is formed from a plurality of reinforced concrete wedge-shaped hollow sections (20), wherein each wedge-shaped hollow section (20) has side mating faces (28), a first end wall (30A), a second end wall (30B), an inner circumferential wall (32A), an outer circumferential wall (32B), and a hollow interior cavity (34), and wherein a plurality of ducts (36) extend circumferentially through the first and second end walls (30A, 30B), the hull (12) further including at least one post-tensioning tendon (26) extending through each of the plurality of circumferentially extending ducts (36) in the first and second end walls (30A, 30B), the post-tensioning tendons (26) stressed and anchored to a portion of the hull (12) and connecting at least two adjacent wedge-shaped hollow sections (20) together, and wherein when assembled to form the hull (12), the plurality of hollow sections (20) define a hollow chamber within the assembled hull (12).

13. The wave energy converter (10) according to claim 1, wherein the hull (72) is cylindrical in shape, has a first end (72A), a second end (72B), a longitudinally extending axis (B), and a centrally formed passageway (74) extending from the first end (72A) to the second end (72B), wherein the hull (72) is formed from a plurality of annular sections (76), and wherein each annular section (76) has a first axial end face (78), a second axial end face (80), a circumferentially extending wall (82), and plurality of ducts (84) extending through the wall (82).

14. A wave energy converter (10) capable of floating on a body of water (BW) and moving in response to waves (W) occurring in the body of water (BW), the wave energy converter (10) comprising a hull (12) connected to a heave plate (14), characterized in that:
- the hull (12) is formed from reinforced concrete;
- a plurality of connecting tendons (16) extending between the hull (12) and the heave plate (14); and
- a power take off (66) attached to each connecting tendon (16);
- wherein the hull (88) has a rectangular cross-section, has a first end (88A), a second end (88B), a longitudinally extending axis (C), and a plurality of longitudinally extending bulkheads (90) that divide the hull (88) into four longitudinally extending hollow chambers (92), wherein the hull (88) is formed from a plurality of body sections (94) mounted between two end sections (96), and wherein each body section (94) includes the plurality of longitudinally extending bulkheads (90) which divide the body sections (94) into portions of the four longitudinally extending hollow chambers (92).

15. A wave energy converter (10) capable of floating on a body of water (BW) and moving in response to waves (W) occurring in the body of water (BW), the wave energy converter (10) comprising a hull (100) connected to a heave plate (14), characterized in that:
- the hull (100) is formed from reinforced concrete;
- a plurality of connecting tendons (16) extending between the hull (12) and the heave plate (14); and
- a power take off (66) attached to each connecting tendon (16);
- wherein one of the hull (100) and the heave plate (14) has a longitudinally extending axis (D), a centrally formed passageway (102) extending therethrough, a rectangular cross-sectional shape, includes a plurality of body sections (94), and a plurality of connecting sections (104) defining corners of the hull (100), wherein the connecting sections (104) have a triangular cross-section, and wherein each body section (94) includes a plurality of longitudinally extending bulkheads (90) which divide the body sections (94) into longitudinally extending hollow chambers (92).

16. A method of assembling a wave energy converter (10) comprising the steps of:
- constructing reinforced concrete wedge-shaped hollow sections (20) of a wave energy converter hull (12), each wedge-shaped hollow section (20) having side mating faces (28), a first end wall (30A), a second end wall (30B), an inner circumferential wall (32A), an outer circumferential wall (32B), and a hollow interior cavity (34), and a plurality of ducts (36) extending circumferentially through the first and second end walls (30A, 30B);
- assembling the wedge-shaped hollow sections (20) to form the hull (12);
- extending at least one post-tensioning tendon (26) through each of the plurality of ducts (36) in the first and second end walls (30A, 30B), the post-tensioning tendons (26) stressed and anchored to a portion of the hull (12) and connecting at least two adjacent wedge-shaped hollow sections (20) of the hull (12) together;
- constructing reinforced concrete wedge-shaped hollow sections (24) of a wave energy converter heave plate (14), each wedge-shaped hollow section (24) having side mating faces (28), a first end wall (30A), a second end wall (30B), an inner circumferential wall (32A), an outer circumferential wall (32B), and a hollow interior cavity (34), and a plurality of ducts (36) extending circumferentially through the first and second end walls (30A, 30B);
- assembling the wedge-shaped hollow sections (24) to form the heave plate (14);
- extending at least one post-tensioning tendon (26) through each of the plurality of ducts (36) in the first and second end walls (30A, 30B), the post-tensioning tendons (26) stressed and anchored to a portion of the heave plate (14) and connecting at least two adjacent wedge-shaped hollow sections (24) of the heave plate (14) together;
- attaching a plurality of connecting tendons (16) between the hull (12) and the heave plate (14); and
- attaching a power take off (66) to each tendon to define the wave energy converter (10).

* * * * *